United States Patent
Kim (10) Patent No.: US 11,668,313 B2
(45) Date of Patent: Jun. 6, 2023

(54) TURBO BLOWER CAPABLE OF OPERATING IN SURGE AREA

(71) Applicant: TURBOWIN CO., LTD., Cheongju-si (KR)

(72) Inventor: Minsoo Kim, Daejeon (KR)

(73) Assignee: TURBOWIN CO., LTD., Cheongju-si (KR)

( * ) Notice: Subject to any disclaimer, the term of this patent is extended or adjusted under 35 U.S.C. 154(b) by 148 days.

(21) Appl. No.: 17/296,097

(22) PCT Filed: Nov. 21, 2019

(86) PCT No.: PCT/KR2019/015994
§ 371 (c)(1),
(2) Date: May 21, 2021

(87) PCT Pub. No.: WO2020/111653
PCT Pub. Date: Jun. 4, 2020

(65) Prior Publication Data
US 2022/0010801 A1    Jan. 13, 2022
US 2022/0010801 A1    Jan. 13, 2022

(30) Foreign Application Priority Data

Nov. 27, 2018  (KR) .......................... 10-2018-0148435

(51) Int. Cl.
*F04D 27/02*  (2006.01)
*F04D 27/00*  (2006.01)

(52) U.S. Cl.
CPC ....... *F04D 27/0207* (2013.01); *F04D 27/001* (2013.01); *F04D 27/0292* (2013.01)

(58) Field of Classification Search
CPC .. F04D 27/02; F04D 27/0223; F04D 27/0207; F04D 27/0215
See application file for complete search history.

(56) References Cited

U.S. PATENT DOCUMENTS

| | | | |
|---|---|---|---|
| 4,948,332 A | 8/1990 | Blotenberg | |
| 10,557,473 B2 | 2/2020 | Thornton et al. | |
| 2001/0014280 A1* | 8/2001 | Blotenberg | ......... F04D 27/0207 415/1 |

FOREIGN PATENT DOCUMENTS

| | | |
|---|---|---|
| JP | 2000-080999 A | 3/2000 |
| KR | 10-2007-0064494 A | 6/2007 |
| KR | 10-2014-0017925 A | 2/2014 |
| KR | 10-1450298 B1 | 10/2014 |
| KR | 10-2016-0022061 A | 2/2016 |
| KR | 10-2016-0124143 A | 10/2016 |

* cited by examiner

*Primary Examiner* — Richard A Edgar
(74) *Attorney, Agent, or Firm* — Rabin & Berdo, P.C.

(57) ABSTRACT

A turbo blower operable in a surge area and, more particularly, a turbo blower operable in a surge area is provided. The turbo blower increases consistency of performance thereof and efficiency by preventing suspension thereof due to a temporarily generated surge by operating even in a surge area for a predetermined time in addition to a normal area in which the turbo blower normally operates.

1 Claim, 5 Drawing Sheets

TURBO BLOWER CAPABLE OF OPERATING IN SURGE AREA

TECHNICAL FIELD

The present disclosure relates to a turbo blower capable of operating in a surge area and, more particularly, to a turbo blower capable of operating in a surge area, the turbo blower increasing consistency of performance thereof and efficiency by preventing suspension thereof due to a temporarily generated surge by operating even in a surge area for a predetermined time in addition to a normal area in which the turbo blower normally operates.

BACKGROUND ART

A turbo blower is a device that discharges an air by increasing a pressure of the air sucked from the outside by a certain range.

A surge is generated when the compression ratio to the flow rate of such a turbo blower is high, and means that the rotating body of the turbo blower runs idle, resulting in an irregular flow of flow and resulting in an unstable state that cannot be controlled.

The surge is generated when the flow rate of the suction part that inhales the air is low, when the pressure of the suction part rises, when the pressure rises as the flow rate decreases in a case that the discharge flow rate is suppressed by a valve, etc., and when the speed thereof suddenly increases due to a malfunction of a control system.

In this way, the surge generated during operation causes fatal damage to the turbo blower. Accordingly, in the case of a conventional turbo blower, when the surge occurs, the system is immediately shut off and the operation of the turbo blower is stopped.

This is the most appropriate method to protect the turbo blower. However, an unconditional stop in the conventional turbo blower system has a problem in that the operation of the turbo blow is stopped even in the case of a temporary surge that does not have a large strain on the turbo blower.

In this case, after stopping and stabilizing the turbo blower, it is necessary to restart the turbo blower and the system to supply air to the line again. Therefore, there is a hassle that it is necessary to re-stabilize the line.

That is, the energy and the time are wasted for re-stabilization of the line due to a temporary surge that can be overcome.

Accordingly, an object of the present invention is to provide a turbo blower device capable of overcoming a temporary surge caused by various factors while maintaining the operation of the turbo blower, which solves the conventional problem.

In the meantime, as a prior art for a turbo blower capable of operating in a surge region, "an operation controller of a turbo blower" of Korean Patent publication No. 10-2014-0017925 (hereinafter referred to as "Patent Literature 1") is disclosed.

Patent Literature 1 relates to an operation controller of a turbo blower capable of simplifying the surge or overload-detecting method to simplify control and providing a user convenience for an unskilled worker to conduct related works. The operation controller of a turbo blower comprises a pressure sensing part for detecting the differential pressure of the turbo-blower by comparing the external pressure of the turbo-blower with the internal pressure of the turbo-blower; an airflow obtaining part for converting the differential pressure of the turbo-blower into the airflow of the turbo-blower; an abnormality detecting condition setting part for obtaining and storing conditions for detecting a surge and overload, which are inputted by a user; an airflow control part for adjusting the airflow of the turbo-blower based on the calculated airflow, detecting the generation of a surge or overload by analyzing the calculated airflow depending on the conditions for detecting a surge and overload, and immediately stopping the operation of the turbo-blower when a surge or overload is generated; and an airflow adjusting part for determining the airflow of the turbo-blower or determining whether or not to operate the turbo-blower by controlling the operation of the motor of the turbo-blower under the control of the airflow control part.

As another prior art, the "a diffusion turbo blower" of Korean Patent Application publication No. 10-2016-0022061 (hereinafter referred to as "Patent Literature 2") is disclosed.

Patent Literature 2 relates to a diffusion turbo blower wherein control can be simplified by simplifying a method for detecting a surge or overload and an unskilled worker can conduct the operation. The diffusion turbo blower comprises a pressure sensing part for detecting the differential pressure of the turbo-blower by comparing the external pressure of the turbo-blower with the internal pressure of the turbo-blower; an airflow obtaining part for converting the differential pressure of the turbo-blower into the airflow of the turbo-blower; an abnormality detecting condition setting part for obtaining and storing conditions for detecting a surge and overload, which are inputted by a user; an airflow control part for adjusting the airflow of the turbo-blower based on the calculated airflow, detecting the generation of a surge or overload by analyzing the calculated airflow depending on the conditions for detecting a surge and overload, and immediately stopping the operation of the turbo-blower when a surge or overload is generated; and an airflow adjusting part for determining the airflow of the turbo-blower or determining whether or not to operate the turbo-blower by controlling the operation of the motor of the turbo-blower under the control of the airflow control part.

As described above, Patent Literatures 1 and 2 are the same technical field as the present invention and disclose means and methods for coping with the occurrence of the surge. However, there is a difference in terms of the subject matters to be solved by the invention (object of the invention).

That is, Patent Literatures 1 and 2 are inventions for stopping the operation of the turbo blower when a surge or overload occurs. However, there is a difference in technical features from the present invention for maintaining the operation thereof within the range that does not damage the turbo blower even if a surge occurs.

Accordingly, there are differences in the problem to be solved by the invention, the solution means for solving it, and the effect exerted by it.

PATENT LITERATURE

Patent Literature 1: Korean Patent publication No. 10-2014-0017925 (Feb. 12, 2014)
Patent Literature 2: Korean Patent publication No. 10-2016-0022061 (Feb. 29, 2016)

DISCLOSURE

Technical Problem

The present disclosure has been made in an effort to solve the problems of the related art and an object of the present disclosure is to provide a turbo blower apparatus that operates a turbo blower even in a surge area for a predetermined time in addition to a normal area.

That is, an object of the present disclosure is to provide a turbo blower apparatus that instantaneously enlarges and controls an operation range so that operation of a turbo blower in a surge area can move to operation in a normal area by determining whether the turbo blower is temporarily operating in the surge area without immediately stopping the operation of the turbo blower when a surge is generated.

Another object of the present disclosure is to provide a turbo blower apparatus that increases consistency of performance and efficiency of a turbo blower by controlling operation of the turbo blower in a surge area.

Technical Solution

According to one aspect of the present invention so as to accomplish these objects, there is provided to a turbo blower capable of operating in a surge area that includes:

a turbo blower machine unit increasing pressure of external air flowing inside and then discharging the external air; and a turbo blower control unit driving the turbo blower machine unit, in which the turbo blower machine unit is stably operated for a predetermined time even in a surge area.

At this time, the turbo blower control unit includes:

an inverter supplying power to the turbo blower machine unit;

an operation panel setting and checking a real-time status of the turbo blower machine unit powered through the inverter;

a surge area detection driver controlling the turbo blower machine unit to be stably operated for a predetermined time even in a surge area;

a data storage unit storing data about an operation history, a surge operation history, and a surge history of the turbo blower machine unit; and a controller controlling the inverter, the operation panel, the surge area detection driver, and the data storage unit.

As described above, the turbo blower machine unit is controlled to keep stably operating for a predetermined time even in the surge area, so the operation in the surge area is induced to operation in a normal area.

In the meantime, it should be understood that the terminology or the words used in claims should not be interpreted in normally or lexically sense. It should be interpreted as meaning and concept consistent with the technical idea of the present invention, based on the principle that the inventor can properly define the concept of the term in order to describe its invention in the best way.

Therefore, the embodiments described in the present specification and the configurations shown in the drawings are only the most preferred embodiments of the present invention, and not all the technical ideas of the present invention are described. Therefore, it is to be understood that various equivalents and modifications are possible.

Advantageous Effects

As described above in relation to the configuration and operation, according to the present disclosure, the operation range of the turbo blower is enlarged such that the turbo blower is operated for a predetermined time in a surge area in addition to a normal area.

That is, when a surge is generated during operation of the turbo blower, the operation of the turbo blower is not necessarily suspended, and whether it is temporary operation in a surge area is determined and the operation in the surge area is controlled so that it can be moved to the operation in the normal area such that the operation of the turbo blower is maintained within a large operation range.

Further, since the operation of the turbo blower is controlled in a surge area, consistency of performance and efficiency of the turbo blower is improved.

That is, temporary stoppage of air that is supplied to a line is prevented by stably enlarging the operation range of the turbo blower, whereby consistency of the line is maximized and productivity of the line is correspondingly maximized.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

1: turbo blower
100: body housing
120: air inlet
130: turbo blower
131: turbo blower casing
132: impeller
133: turbo blower motor
140: air discharge cone pipe
150: turbo blower silencer
160: electric valve
170: blow-off valve
210: inverter
220: operation panel
230: surge area detection driver
231: surge area sensing unit
232: automatic control valve activator
233: surge area operation maintainer
233a: first automatic control valve range setting module
233b: second automatic control valve range setting module
233c: third automatic control valve range setting module
240: data storage unit
250: controller
260: exclusive terminal communication unit
S100: power-applying step
S200: turbo blower machine unit-stopping step
S300: turbo blower machine unit-checking step
S400: turbo blower machine unit-operating step
S500: in-normal area operation-checking step S600: in-surge area operation-sensing step
S700: in-surge area operation-allowing step
S800: electric valve-opening/closing step
S900: turbo blower machine unit-suspending step
S1000: operation-stopping step
R: rotor
S: stator
CR: normal area
IA: air intake duct
OA: air discharge duct
SP: exclusive terminal
SR: surge area

BEST MODE

Mode for Invention

Hereafter, the function, configuration, and operation of a turbo blower capable of operating in a surge area according to the present disclosure are described in detail with reference to the accompanying drawings.

Figure 1:
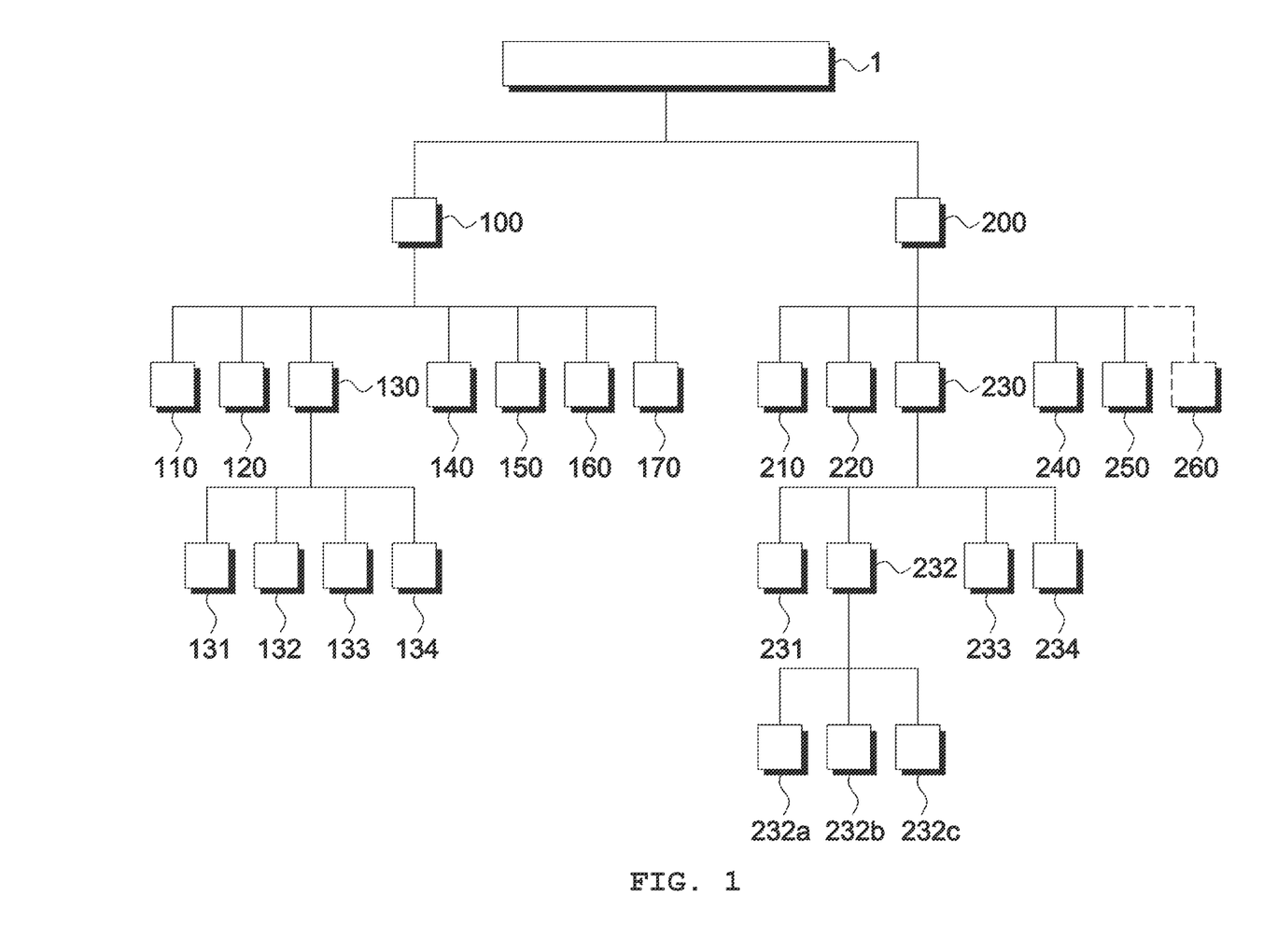
FIG. 1 is a diagram showing the configuration of a turbo blower capable of operating in a surge area of the present disclosure.
Figure 2:
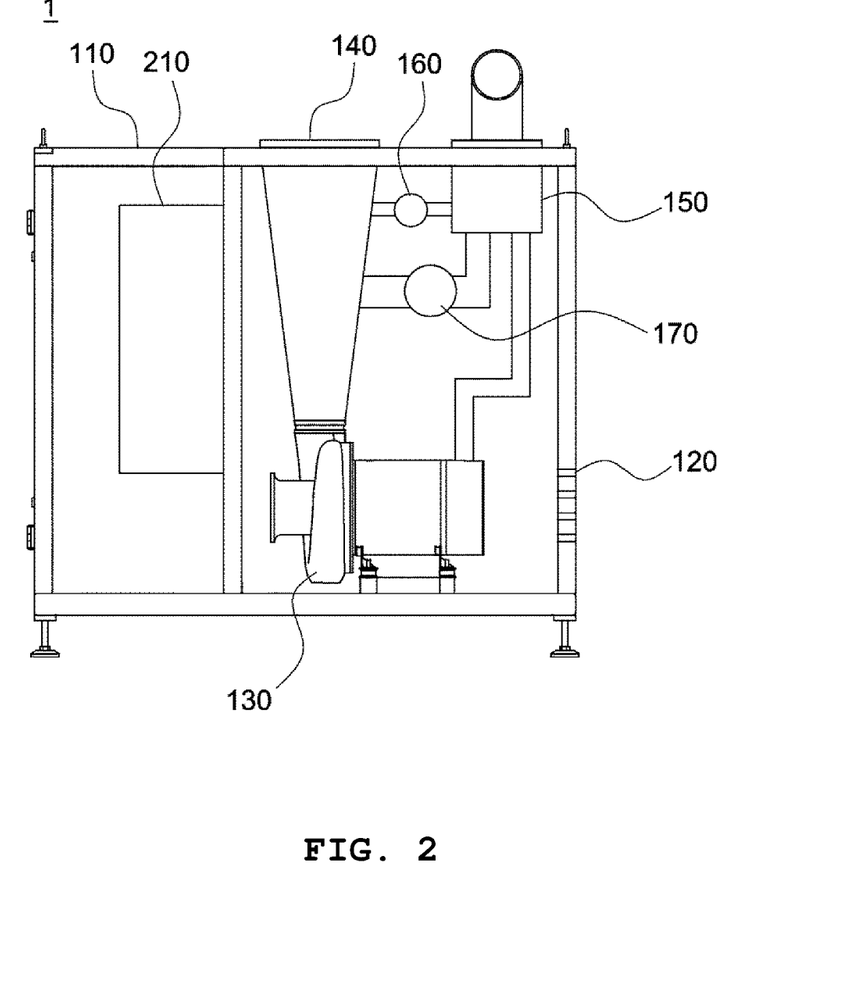
FIG. 2 is a schematic diagram showing the turbo blower capable of operating in a surge area of the present disclosure.
Figure 3:
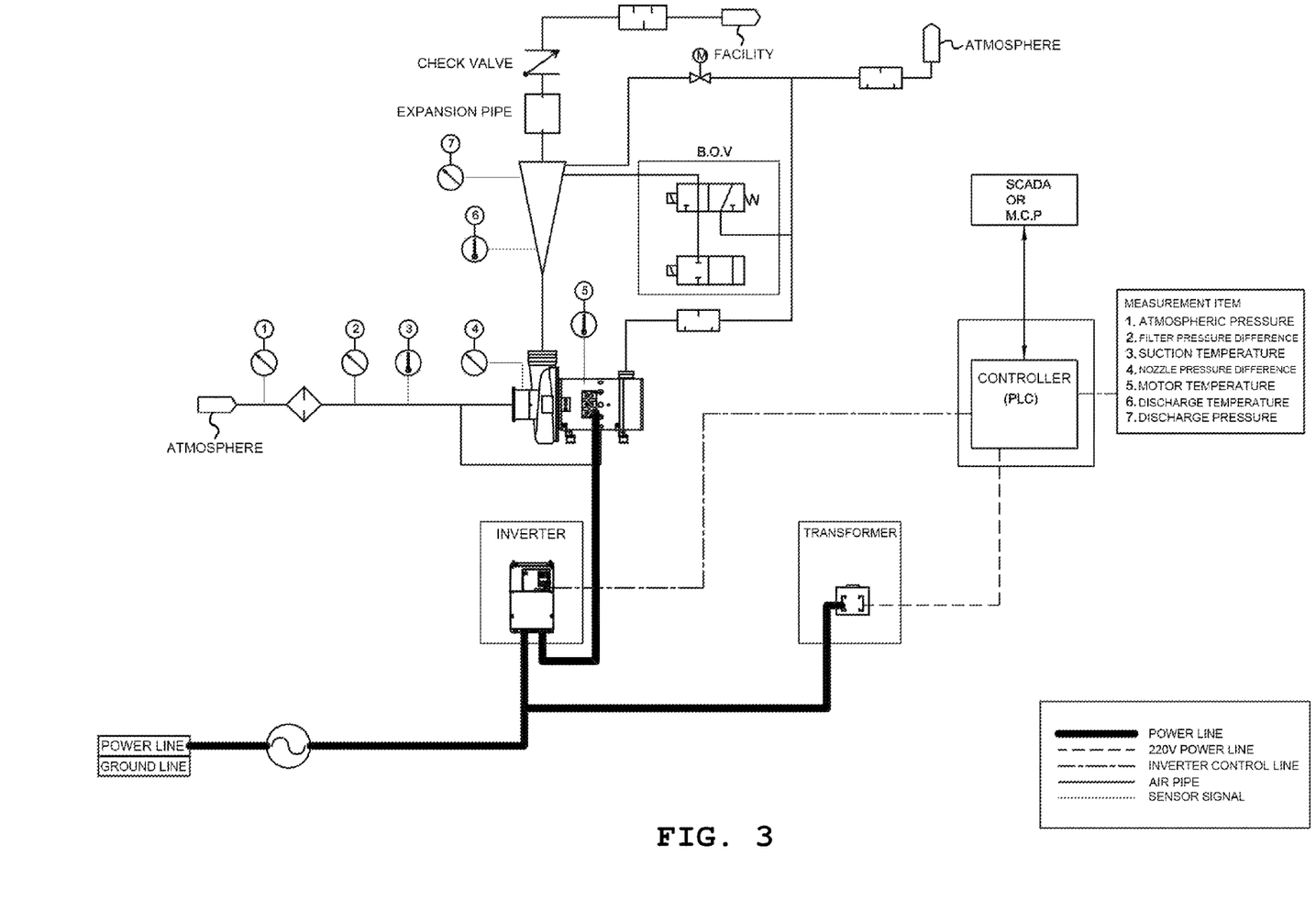
FIG. 3 is a schematic piping and instrument diagram of the turbo blower capable of operating in a surge area of the present disclosure.

FIG. 1 is a diagram showing the configuration of a turbo blower capable of operating in a surge area of the present disclosure, FIG. 2 is a schematic diagram showing the turbo blower capable of operating in a surge area of the present disclosure, and FIG. 3 is a schematic piping and instrument diagram of the turbo blower capable of operating in a surge area of the present disclosure.

As shown in FIGS. 1 to 3,
the present disclosure provides a turbo blower (1) capable of operating in a surge area that includes:
a turbo blower machine unit (100) increasing pressure of external air flowing inside and then discharging the external air; and
a turbo blower control unit (200) driving the turbo blower machine unit (100),
in which the turbo blower machine unit (100) is stably operated for a predetermined time even in a surge area (SR).

Figure 5:
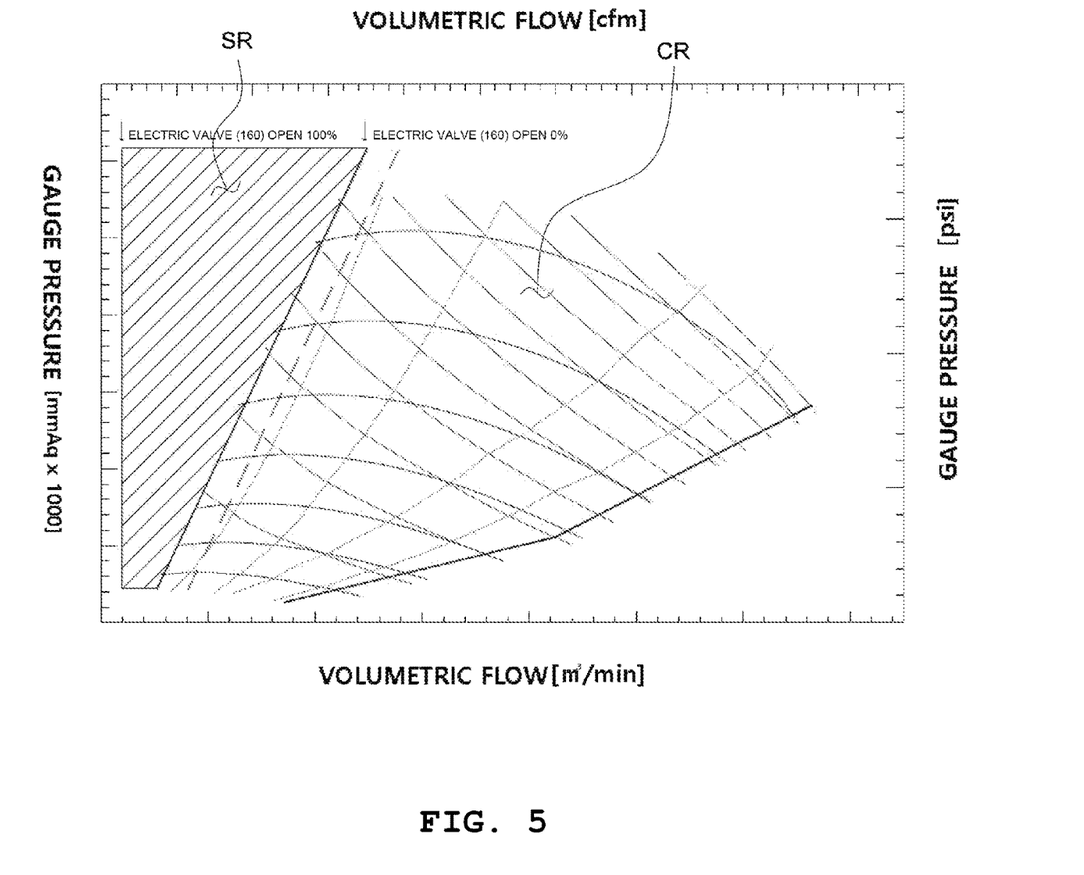
FIG. 5 illustrates a performance table of a gauge pressure-volume flow rate relationship for the turbo blower capable of operating in a surge area of the present disclosure.

That is, the present disclosure provides a turbo blower apparatus that maximizes consistency of performance and efficiency of the turbo blower machine unit (100) by temporarily enlarging the operation range so that the turbo blower machine unit (100) can keep stably operating even in a surge area without stopping, as in the performance table related to gauge pressure-volume flow rate shown in FIG. 5.

In more detail, according to turbo blowers of the related art, when operation of a turbo blower approaches a surge area (SR), the operation of the turbo blower is stopped in spite of a temporary surge that does not always damage the turbo blower on the purpose of protection of the turbo blower, so there is a problem that the flow or air that is supplied to a line through the turbo blower is made more unstable. However, the present disclosure solves this problem of the related art, so when it is determined that it is operation in a surge area (SR) by a temporary surge, the turbo blower machine unit (100) keeps operating. Accordingly, the flow of air that is supplied to the turbo blower (130) and a line is made more stable, whereby efficiency of the turbo blower (130) is maximized.

That is, the operation of the turbo blower machine unit (100) in a surge area (SR) due to a temporary surge that does not damage the turbo blower machine unit (100) stands by to be capable of moving to a normal area (CR). Accordingly, the turbo blower machine unit (100) can keep stably operating without stopping even under a temporary surge.

The turbo blower control unit (200) that controls operation of the turbo blower machine unit (100) in a normal area (CR) and a surge area (SR) due to a temporary surge is described in more detail.

The turbo blower control unit (200) includes:
an inverter (210) supplying power to the turbo blower machine unit (100);
an operation panel (220) setting and checking a real-time status of the turbo blower machine unit (100) powered through the inverter (210);
a surge area detection driver (230) controlling the turbo blower machine unit (100) to be stably operated for a predetermined time even in a surge area (SR);
a data storage unit (240) storing data about an operation history, a surge operation (SR) history, and a surge history of the turbo blower machine unit (100); and
a controller (250) controlling the inverter (210), the operation panel (220), the surge area detection driver (230), and the data storage unit (240).

As described above, the turbo blower machine unit (100) is controlled to keep stably operating for a predetermined time even in the surge area (SR), so the operation in the surge area (SR) is induced to operation in a normal area (CR).

In particular, the surge area detection driver (230) that controls the turbo blower machine unit (100) to be stably operated for a predetermined time set in advance by a manager in the surge area (SR) in consideration of the performance of the turbo blower machine unit (100) and the status of a line for supplying air, in more detail, includes:
a surge area sensing unit (231) sensing whether the operation status of the turbo blower machine unit (100) is operation in the normal area (CR) or operation in the surge area (SR);
an automatic control valve activator (232) automatically controlling an electric valve (160) in accordance with the degree of opening/closing set by the manager when the surge area sensing unit (231) senses the operation in the surge area (SR);
a surge area operation maintainer (233) keeping the operation of the turbo blower machine unit (100) by operation of the automatic control valve activator (232); and
a surge area operation stopper (234) suspending the operation of the turbo blower machine unit (100) when the surge area operation maintainer (233) determines that the turbo blower machine unit (100) is operated in the surge area (SR) by not a temporary surge, but a surge that damages the turbo blower machine unit (100).

The automatic control valve activator (232) that automatically controls the electric valve (160) in accordance with the degree of opening/closing set by the manager includes:
a first automatic control valve range setting module (233a) setting the degree of opening/closing of the electric valve (160) according to the continuation time of a surge generated in the turbo blower machine unit (100) such that the turbo blower machine unit (100) operates in the surge area (SR), under the assumption that the degree of opening/closing of the electric valve (160) is 0[%] to 100[%];
a second automatic control valve range setting module (233b) setting the degree of opening/closing of the electric valve (160) according to the continuation time of a surge generated in the turbo blower machine unit (100) such that the turbo blower machine unit (100) operates in the surge area (SR), except for the range set by the first automatic control valve range setting module (233a); and
a third automatic control valve range setting module (233c) setting the degree of opening/closing of the electric valve (160) according to the continuation time of a surge generated in the turbo blower machine unit (100) such that the turbo blower machine unit (100) operates in the surge area (SR), except for the ranges set by the first automatic control valve range setting module (233a) and the second automatic control valve range setting module (233b).

By setting and controlling the degree of opening/closing of the electric valve (160) according to generation and continuation time of a surge, an operation range is enlarged such that operation in a surge area (SR) is allowed within a range in which the turbo blower machine unit (100) is not damaged.

Figure 4:
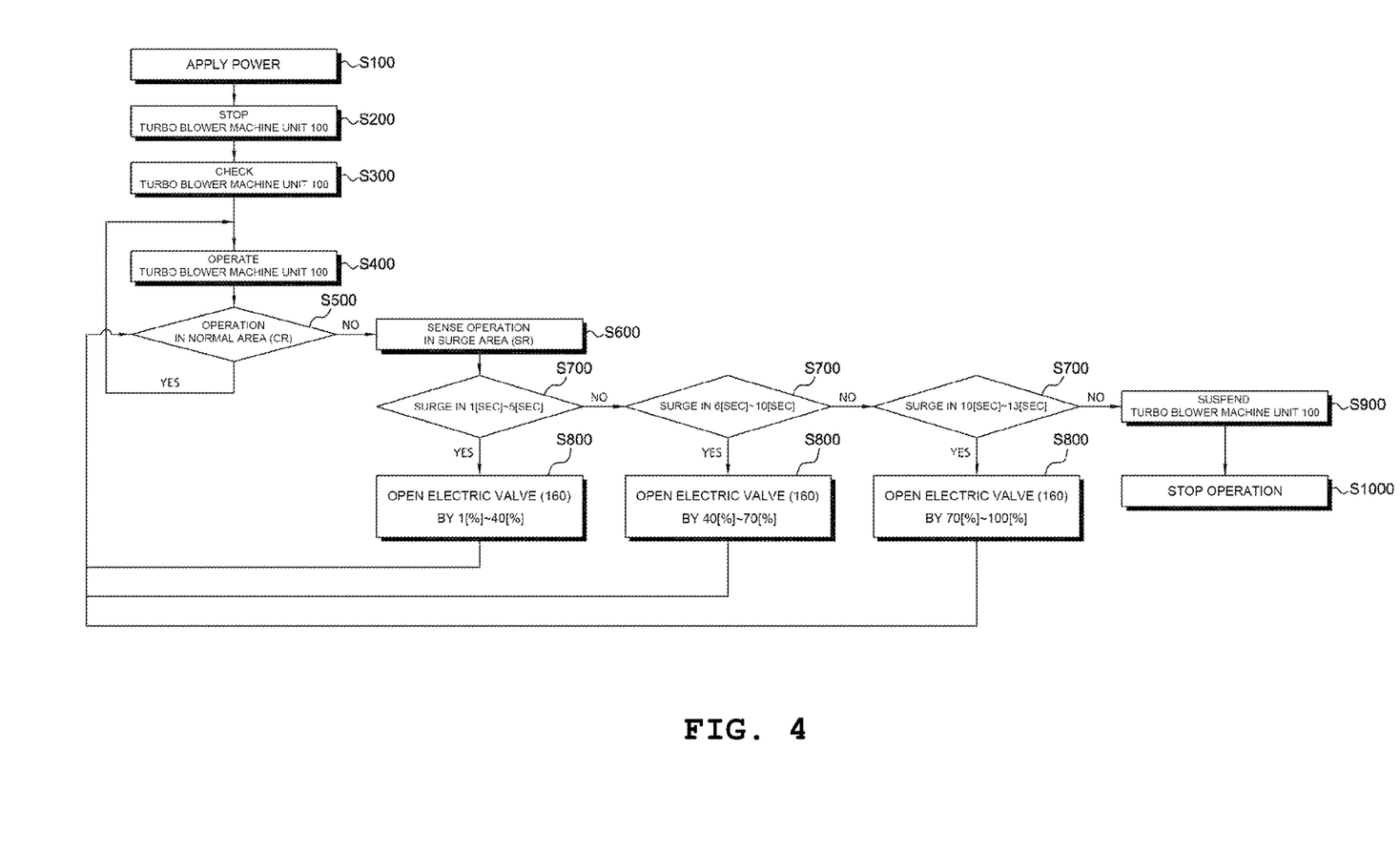
FIG. 4 illustrates briefly a flow chart showing an operation flow of the turbo blower capable of operating in a surge area of the present disclosure.

In more detail, for example, as shown in FIG. 4, the range of the first automatic control valve range setting module (233a) is set such that the electric valve (160) is opened 1[%] to 40[%] when a surge continues within 1 [sec] to 5 [sec], the range of the second automatic control valve range setting module (233b) is set such that the electric valve (160) is opened 40[%] to 70[%] when a surge continues within 6 [sec] to 10 [sec], and the range of the third automatic control valve range setting module (233c) is set such that the electric valve (160) is opened 70[%] to 100[%] when a surge continues within 10 [sec] to 13 [sec].

Accordingly, the degree of opening/closing of the electric valve (160) is set for each level of the continuation time of a surge, whereby the operation range is flexibly enlarged such that the operation of the turbo blower machine unit (100) in the surge area (SR) can move to the operation in the normal area (CR).

In this case, 0[%] means full closing of the electric valve (160) and 100[%] means full opening of the electric valve (160).

Further, the turbo blower control unit (200) further includes an exclusive terminal communication unit (260) enabling the manager to set operation information and check the operation status of the turbo blower machine unit (100) through an exclusive terminal (SP) through a communication network (IP), other than the operation panel (220) directly operated by the manager.

Accordingly, it is possible for the manager to more easily manage the turbo blower (1) capable of operating in a surge area of the present disclosure and to check and set the status of the turbo blower machine unit (100) in real time at any time within a section connected with the communication network (IT) so that stable operation is maintained.

When the turbo blower control unit (200) further includes the exclusive terminal communication unit (260), the controller (250) should be configured to be capable of controlling the exclusive terminal communication unit (260).

Meanwhile, the turbo blower machine unit (100) that suctions air, increases the pressure of the air, and then discharges the air includes:

a body housing (110) having a predetermined size in which a predetermined space is formed;

an air inlet (120) formed on a side of the body housing (110);

a turbo blower (130) disposed in the body housing (110) and suctioning and discharging air flowing into the air inlet (120);

an air discharge cone pipe (140) coupled to the turbo blower (130) and sending the air discharged through the turbo blower (130) to the body housing (110);

a turbo blower silencer (150) suppressing and decreasing noise generated from the inside of the body housing (110);

the electric valve (160) of which the degree of opening/closing is automatically controlled due to a surge; and a blow-off valve (170) being automatically opened/closed in accordance with the status of the turbo blower (130).

The turbo blower (130), in broad meaning, includes:

a turbo blower casing (131) having an air intake duct (IA) and an air discharge duct (OA);

an impeller (132) suctioning air into the turbo blower casing (131), increasing the pressure of the air, and then discharging the air;

a turbo blower motor (133) composed of rotor (R) and a stator (S) that rotate the impeller (132); and a cooler (134) preventing an increase of the internal temperature of the turbo blower casing (131).

Accordingly, energy is applied to the air that is suctioned into the air intake duct (IA) by rotation of the impeller (132), whereby the amount and pressure of air are increased and the air increased in pressure is discharged to the air discharge duct (OA).

Meanwhile, the operation flow of the turbo blower (1) capable of operating in a surge area of the present disclosure is briefly described with reference to FIG. 4.

Power is applied to the operation panel (220) and the inverter (210) using a main breaker (◀ S100, power-applying step), the status of the turbo blower machine unit (100) still stopped is maintained (◀ S200, turbo blower machine unit-stopping step), a manager checks the status of the turbo blower machine unit (100) that is output from the operation panel (220) (◀ S300, turbo blower machine unit-checking step), the turbo blower machine unit (100) is operated (◀ S400, turbo blower machine unit-operating step), in which, when the turbo blower machine unit (100) operated by the manager is operated in a normal area (CR), the open blow-off valve (170) is closed such that the operation is maintained (◀ S500, in-normal area operation-checking step), sensing a change when the operation range of the turbo blower machine unit (100) is changed to a surge area (SR) due to temporary load reduction (◀ S600, in-surge area operation-sensing step), the operation is maintained for a predetermined time even in the surge area (SR) (◀ S700, in-surge area operation-allowing step), the electric valve (160) is automatically operated/closed within the range of 0[%] to 100[%] by the surge area detection driver (230) (◀ S800, electric valve-opening/closing step), in which operation of the turbo blower machine unit (100) is determined by determining whether it is operation in the surge area (SR) by a temporary surge or operation in a surge area that may damage the turbo blower machine unit (100), if it is operation in a surge area (SR) that the surge area detection driver (230) cannot control, turbo blower machine unit (100) is suspended and the blow-off valve (170) is opened (◀ S900, turbo blower machine unit-suspending step), and the turbo blower machine unit (100) is completely stopped to be protected from the surge (◀ S1000, operation-stopping step).

For reference, the blow-off valve (170) of the components of the present disclosure is installed on the air discharge cone pipe (140) and is provided to effectively suppress pulsation that is generated when the turbo blower (130) is operated and pulsation that may be generated in next-order operation during operation.

That is, the blow-off valve (170) temporarily discharges the air suctioned into the turbo blower (130) to the outside in order to prevent backflow of air increased in pressure and instantaneous reduction of operation efficiency (flow rate) when the air increased in pressure through the turbo blower (130) flows to the air discharge cone pipe (140), thereby discharging the air temporarily increased in pressure to the outside.

In other words, the blow-off valve (170) is a component preventing collision of the air that is suctioned and the air that is discharged after the pressure is increased, has an effect of increasing the time for discharging the air increased in pressure, prevents damage to the impeller (132) of the turbo blower (130), and protects the turbo blower (130).

Further, the turbo blower (130) applied to the present disclosure is a device that discharges air of which the pressure ratio is 1.1 to less than 2.0 and the pressure is increased within the range of 10 [kPa] to 100 [kPa] on the basis of the static pressure ratios at the inlet and the outlet.

Further, in the present disclosure, "stop" means the status in which the turbo blower machine unit (100) is completely stopped and "suspension" means the status in which only the turbo blower (130) of the components of the turbo blower machine unit (100) is stopped.

Further, when specific units are expressed in the present disclosure, they are separated from numbers by square brackets.

That is, for example, the pressure unit "kPa" is expressed as "[kPa]" so that it can be immediately recognized as a specific unit.

The status of the turbo blower machine unit (100) such as a flow rate, pressure, the number of revolutions, and temperature are output on the operation panel (220) so that a manager can immediately check the status.

It will be apparent to those skilled in the art that various modifications and variations can be made in the present invention without departing from the spirit or scope of the invention as defined in the appended claims.

This invention can be implemented in many different forms without departing from technical aspects or main features. Therefore, the implementation examples of this invention are nothing more than simple examples in all respects and will not be interpreted restrictively.

INDUSTRIAL APPLICABILITY

The present invention relates to a turbo blower capable of operating in a surge area, it can be applied to a manufacturing business of manufacturing the turbo blower and sales and management businesses thereof, and further, it can contribute to an improvement in various industrial fields related to the turbo blower.

The invention claimed is:
1. A turbo blower operating in a surge area (SR), a surge defined by parameters of a turbo blower where pressure increase is within a range of 10 kPA to 100 kPA and where a range of static pressure ratios at an inlet and an outlet is not from 1.1 to less than 2.0, comprising:
a turbo blower machine unit configured to increase pressure of external air flowing inside and then to discharge the external air; and a turbo blower control unit configured to drive the turbo blower machine unit such that the turbo blower machine unit is stably operated for a predetermined time even in the surge area (SR),
wherein the turbo blower machine unit which is configured to suction air, to increase the pressure of the air, and then to discharge the air includes:
a body housing having a predetermined size in which a predetermined space is formed;
an air inlet formed on a side of the body housing;
a turbo blower disposed in the body housing and and configured to suction and discharge air flowing into the air inlet;
an air discharge cone pipe coupled to the turbo blower and configured to send the air discharged through the turbo blower to the body housing;
a turbo blower silencer configured to suppress and decrease noise generated from the inside of the body housing;
an electric valve an opening/closing degree of which is automatically controlled due to a surge; and
a blow-off valve configured to be automatically opened/closed in accordance with the status of the turbo blower, to discharge air temporarily increased in pressure to outside in order to prevent backflow of air increased in pressure and instantaneous reduction of operation efficiency when the air increased in pressure through the turbo blower flows to the air discharge cone pipe, the blow-off valve installed on the air discharge cone pipe to effectively suppress pulsation that is generated when the turbo blower is operated and pulsation that may be generated in next-order operation during operation, the blow-off valve configured to prevent collision of the air that is suctioned and the air that is discharged after the pressure is increased, the blow-off valve configured to increase the time for discharging the air increased in pressure, and preventing damage to an impeller of the turbo blower, and protecting the turbo blower,
wherein the turbo blower includes:
a turbo blower casing including an air intake duct (IA) and an air discharge duct (OA);
an impeller configured to suction air into the turbo blower casing, to increase the pressure of the air, and then to discharge the air;
a turbo blower motor including a rotor (R) and a stator (S) that rotate the impeller; and
a cooler configured to prevent an increase of the internal temperature of the turbo blower casing,
wherein energy is applied to the air that is suctioned into the air intake duct (IA) by rotation of the impeller, thereby increasing the amount and pressure of air and discharging the air increased in pressure to the air discharge duct (OA),
wherein the turbo blower control unit that controls operation of the turbo blower machine unit in a normal area (CR) and a surge area (SR) due to a temporary surge includes:
an inverter configured to supply power to the turbo blower machine unit;
an operation panel configured to set and check a real-time status of the turbo blower machine unit powered through the inverter;
circuitry configured to:
control the turbo blower machine unit to be stably operated for a predetermined time even in a surge area (SR);
store data about an operation history, a surge operation (SR) history, and a surge history of the turbo blower machine unit; and control the inverter, the operation panel, controlling of the turbo blower machine unit, and storing of data, wherein the circuitry is further configured to control the turbo blower machine unit to keep stably operating for a predetermined time even in the surge area so that the operation in the surge area (SR) is induced to operation in a normal area, wherein the circuitry is further configured to:
   sense whether the operation status of the turbo blower machine unit is operation in the normal area or operation in the surge area;
   automatically control the electric valve in accordance with the opening/closing degree set by a manager when the operation in the surge area is sensed;
   keep the operation of the turbo blower machine unit by controlling the electric valve; and
   suspend the operation of the turbo blower machine unit when the turbo blower machine unit is determined to be operated in the surge area by not a temporary surge, but a surge that damages the turbo blower machine unit, wherein the circuitry is further configured to:
   set a first range of opening/closing of the electric valve according to the continuation time of a surge generated in the turbo blower machine unit such that the turbo blower machine unit operates in the surge area, under the assumption that the opening/closing degree of the electric valve is 0% to 100%;
   set a second range of the opening/closing degree of the electric valve according to the continuation time of a surge generated in the turbo blower machine unit such that the turbo blower machine unit operates in the surge area, except for the first range; and
   set the opening/closing degree of the electric valve according to the continuation time of a surge generated in the turbo blower machine unit such that the turbo blower machine unit operates in the surge area, except for the first range and the second range, wherein an operation range is enlarged such that operation in a surge area is allowed within a range in which the turbo blower machine unit is not damaged is enlarged by setting and controlling the degree of opening/closing of the electric valve according to generation and continuation time of a surge, and the turbo blower machine unit is controlled to be stably operated for a predetermined time set in advance by the manager in the surge area in consideration of the performance of the turbo blower machine unit and the status of a line for supplying air.

\* \* \* \* \*